Patented Apr. 14, 1931

1,800,206

UNITED STATES PATENT OFFICE

WALTER BIRETT, OF BERLIN-CHARLOTTENBURG, GERMANY, ASSIGNOR TO SIEMENS & HALSKE AKTIENGESELLSCHAFT, OF SIEMENSSTADT, NEAR BERLIN, A CORPORATION OF GERMANY

ELECTROLYTIC PRODUCTION OF LEAD PEROXIDE

No Drawing. Application field October 6, 1928, Serial No. 310,924, and in Germany October 22, 1927.

This invention relates to electrolytic production of lead peroxide; and it comprises a method of producing firm, cohering and impervious coatings of lead peroxide ($PbO_2$) on metals wherein the metal article to be coated is made an anode in an alkaline bath containing lead oxid (PbO) and also containing as a solvent for lead a suitable organic compound which contains only a carboxyl group.

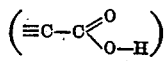

or only a carbonyl (=C=O) group, or only a hydroxyl group (≡C—O—H) or both a carbonyl and a hydroxyl group connected to different C-atoms; all as more fully hereinafter set forth and as claimed.

Lead peroxide is sometimes used as a protective and decorative coating for electric conductors and other metallic objects. It can be applied by making the metal object an anode in a solution of a lead compound. The best type of coating is obtained from alkaline baths such as may be obtained by dissolving lead oxid (litharge) in a solution of caustic soda or caustic potash.

The lead peroxide coatings so obtained are not usually as smooth, even, coherent and impervious as is desirable; and it is an object of the present invention to provide a manner of operating giving better coatings.

For this purpose I use certain organic addition agents in the bath as solvents for lead. These compounds may be conveniently divided into four classes, (1) those containing hydroxyl (≡COH) groups only, (2) those containing carboxyl

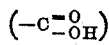

groups only, (3) those containing carbonyl (=C=O) groups only and (4) those containing both carbonyl and hydroxyl groups which are connected to different carbon atoms; that is the group

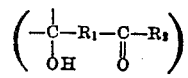

where $R_1$ represents one or more substituted carbon atoms and $R_2$ represents a hydrogen atom or one or more substituted carbon atoms. These compounds are homogeneously substituted; that is they contain groups from one only of the above classes. The presence of substituents not included in these four classes is not excluded.

The hydroxyl may be alcoholic or phenolic. With these organic agents in the coating bath coatings of lead peroxide on metal are obtained of smooth and uniform character, serving excellently to protect the underlying metal against the influence of air and moisture. The protective coatings may be produced on electric wires or on shapes subsequently to be used as insoluble anodes in various electrolytic operations. The character of the coatings is such that they may be used for rust proofing iron and steel, giving positive protection against the penetration of air and moisture.

As organic substances coming within the above classification which I have found useful in the present invention I may mention sugar, glycerin, phenol, resorcin, hydroquinone, pyrogallol, tannin, phloroglucin, and fluorescein. I have noted that as a rule these compounds behave better in the bath the more oxy groups there are in the molecule. The solvent power for lead oxid in the presence of alkali increases with increases in the number of hydroxy groups. Acetic acid and succinic acid are also useful.

In a specific example of the present process as applied to the formation of a protective coating on wire I may note one particular operation in which I dissolved hydroquinone in distilled water, using the proportions of 700 grams of the commercial grade to 10 liters of distilled water. To this solution, and these proportions, I added 50 grams of commercial caustic soda. The alkaline solution darkens on exposure to air, and especially when warm but this is immaterial. In the clear solution I next dissolved a kilogram of commercial yellow lead oxid or litharge; litharge being added in successive small portions. I found it desirable to wet the litharge before adding. In any event, a fine powdered grade should be employed. Solution can be accelerated by heating. The solution formed was used as an electrolytic bath employing a suitable cathode and making the wire to be coated an anode. The wire may travel progressively through the bath. The particular current density used in this work was 0,5 amperes per square decimeter.

The other organic bodies mentioned may be employed in the same way and in about the same proportions. Litharge is a convenient source of lead for making the bath but other lead salts may be employed.

Addition agents of quite another type, those containing nitrogen in the molecule (cyanids, sulfocyanids, dimethyl-glyoxim, alizarin bordeaux, etc.) may be used, for the present purposes and with like results; but these I do not herein claim, they forming the matter of a copending application of Johannes Fischer, Serial No. 310,919, filed Oct. 6, 1928.

What I do claim is:—

1. In the formation of protective coatings of lead peroxide on metal objects, the process which comprises making such an object an anode in an alkaline solution containing lead and an organic oxygen-containing compound which is homogeneously substituted by at least one substituent selected from a group consisting of

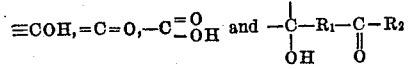

wherein $R_1$ represents at least one substituted carbon atom and $R_2$ represents a hydrogen atom or at least one substituted carbon atom.

2. In the formation of protective coatings of lead peroxide on metal objects, the process which comprises making such an object an anode in an alkaline solution containing lead and also containing as a solvent for lead a carbon compound carrying a carbonyl and a hydroxyl group in the molecule, connected to different C-atoms.

3. In the formation of protective coatings of lead peroxide on metal objects, the process which comprises making such an object an anode in an alkaline solution containing lead and also containing as a solvent for lead a carbon compound carrying a carbonyl and a hydroxyl group in the molecule, connected to different C-atoms, the hydroxyl group existing as phenolic hydroxyl.

4. In the formation of protective coatings of lead peroxide on metal objects, the process which comprises making such object an anode in an alkaline bath containing lead, hydroquinone and a less quantity of caustic soda.

In testimony whereof, I affix my signature.

WALTER BIRETT.